US010650031B2

(12) United States Patent
Carlsson et al.

(10) Patent No.: US 10,650,031 B2
(45) Date of Patent: *May 12, 2020

(54) SYSTEMS AND METHODS FOR VISUALIZATION OF DATA ANALYSIS

(71) Applicant: Ayasdi AI LLC, Menlo Park, CA (US)

(72) Inventors: Gunnar Carlsson, Stanford, CA (US); Harlan Sexton, Palo Alto, CA (US); Gurjeet Singh, Palo Alto, CA (US)

(73) Assignee: Ayasdi AI LLC, Los Altos, CA (US)

(*) Notice: Subject to any disclaimer, the term of this patent is extended or adjusted under 35 U.S.C. 154(b) by 545 days.

This patent is subject to a terminal disclaimer.

(21) Appl. No.: 14/577,649

(22) Filed: Dec. 19, 2014

(65) Prior Publication Data
US 2015/0154281 A1 Jun. 4, 2015

Related U.S. Application Data

(63) Continuation of application No. 12/703,165, filed on Feb. 9, 2010, now Pat. No. 8,972,899.

(Continued)

(51) Int. Cl.
*G06F 16/28* (2019.01)
*G06F 3/0484* (2013.01)

(52) U.S. Cl.
CPC .......... *G06F 16/288* (2019.01); *G06F 3/0484* (2013.01); *G06F 3/04842* (2013.01); *G06F 16/287* (2019.01)

(58) Field of Classification Search
CPC ......... G06F 17/30696; G06F 17/30651; G06F 17/30958; G06F 17/30601; G06F 3/0484;
(Continued)

(56) References Cited

U.S. PATENT DOCUMENTS 5,910,803 A 6/1999 Grau et al.
6,226,408 B1 5/2001 Sirosh
(Continued)

FOREIGN PATENT DOCUMENTS

CN 103525917 1/2014
WO 2001031579 5/2001
(Continued)

OTHER PUBLICATIONS

Singh et al., "Topological Methods for the Analysis of High Dimensional Data Sets and 3D Object Recognition", Eurographics Symposium on Point-Based Graphics, 2007.*
(Continued)

*Primary Examiner* — Nicholas Ulrich
(74) *Attorney, Agent, or Firm* — Ahmann Kloke LLP

(57) ABSTRACT

Exemplary systems and methods for visualization of data analysis are provided. In various embodiments, a method comprises accessing a database, analyzing the database to identify clusters of data, generating an interactive visualization comprising a plurality of nodes and a plurality of edges wherein a first node of the plurality of nodes represents a cluster and an edge of the plurality of edges represents an intersection of nodes of the plurality of nodes, selecting and dragging the first node in response to a user action, and reorienting the interactive visualization in response to the user action of selecting and dragging the first node.

19 Claims, 11 Drawing Sheets

Related U.S. Application Data

(60) Provisional application No. 61/151,488, filed on Feb. 10, 2009.

(58) Field of Classification Search
CPC ... G06F 3/04842; G06F 16/288; G06F 16/287
See application file for complete search history.

(56) References Cited

U.S. PATENT DOCUMENTS

| | | |
|---|---|---|
| 6,237,006 B1 | 5/2001 | Weinberg |
| 6,750,864 B1 | 6/2004 | Anwar |
| 6,985,898 B1 | 1/2006 | Ripley et al. |
| 7,020,561 B1 | 3/2006 | McLoughlin et al. |
| 7,366,719 B2 | 4/2008 | Shaw |
| 7,428,554 B1 | 9/2008 | Coberley et al. |
| 7,809,660 B2 | 10/2010 | Friedlander et al. |
| 7,871,769 B2 | 1/2011 | Baker et al. |
| 8,131,471 B2 | 3/2012 | Kincaid |
| 9,353,415 B2 | 5/2016 | Nikolsky et al. |
| 9,514,213 B2 | 12/2016 | Wood et al. |
| 2002/0165934 A1 | 11/2002 | Conrad et al. |
| 2003/0061072 A1 | 3/2003 | Baker et al. |
| 2004/0005584 A1 | 1/2004 | Cohen et al. |
| 2004/0009489 A1 | 1/2004 | Golub et al. |
| 2004/0024532 A1 | 2/2004 | Kincaid |
| 2004/0193019 A1 | 9/2004 | Wei |
| 2004/0234995 A1 | 11/2004 | Musick et al. |
| 2005/0158736 A1 | 7/2005 | Shaw |
| 2005/0246314 A1 | 11/2005 | Eder |
| 2006/0106847 A1 | 5/2006 | Eckardt |
| 2006/0290697 A1 | 12/2006 | Madden |
| 2007/0022000 A1 | 1/2007 | Bodart et al. |
| 2007/0026365 A1 | 2/2007 | Friedrich et al. |
| 2007/0027887 A1 | 2/2007 | Baldwin |
| 2007/0166707 A1 | 7/2007 | Schadt et al. |
| 2008/0001735 A1 | 1/2008 | Tran |
| 2008/0114564 A1 | 5/2008 | Ihara |
| 2009/0204582 A1 | 8/2009 | Grandhi |
| 2009/0299645 A1 | 12/2009 | Colby et al. |
| 2010/0274577 A1 | 10/2010 | Firminger et al. |
| 2010/0332143 A1 | 12/2010 | Onell et al. |
| 2012/0041277 A1 | 2/2012 | Ebadollahi |
| 2012/0158633 A1 | 6/2012 | Eder |
| 2012/0166208 A1 | 6/2012 | Gillam et al. |
| 2013/0041290 A1 | 2/2013 | Kording et al. |
| 2013/0144916 A1 | 6/2013 | Lum et al. |
| 2014/0297642 A1 | 10/2014 | Lum et al. |
| 2017/0164011 A1 | 6/2017 | Rimon et al. |

FOREIGN PATENT DOCUMENTS

| | | |
|---|---|---|
| WO | 2001031580 | 5/2001 |
| WO | 2005003308 | 1/2005 |
| WO | 2006038108 | 4/2006 |
| WO | 2011077353 | 6/2011 |
| WO | 2013070984 | 5/2013 |

OTHER PUBLICATIONS

Filter (higher-order function), Wikipedia, archived at https://en.wikipedia.org/wiki/Filter_(higher-order_function) on Mar. 7, 2008 and retrieved from https://web.archive.org/web/20080307194438/https://en.wikipedia.org/wiki/Filter_(higher-order_function) on Dec. 17, 2018 (Year: 2008).*

Microsoft Computer Dictionary, Mar. 2002, Microsoft Press, Fifth Edition (Year: 2002).*

Diaz, Fernando et al., "gene-CBR: A Case-Based Reasoning Tool for Cancer Diagnosis Using Microarray Data Sets," Computational Intelligence, vol. 22, No. 3-4, pp. 254-268, Aug. 1, 2006.

European Patent Application No. 12839511.8, Search Report dated Jun. 15, 2015.

EP Application No. 10741671.1, Examination Report dated Nov. 13, 2014.

EP Application No. 10741671.1, Search Report dated Feb. 28, 2013.

International Application No. PCT/US2010/023771, International Search Report and Written Opinion dated Apr. 2, 2010.

International Application No. PCT/US2012/059398, International Search Report and Written Opinion dated Jan. 8, 2013.

International Application No. PCT/US2014/031473, International Search Report and Written Opinion dated Nov. 5, 2014.

European Patent Application No. 10741671.1, Examination Report dated Apr. 10, 2017.

European Patent Application No. 14769434.3, Search Report dated Nov. 7, 2016.

European Patent Application No. 14769434.3, Examination Report dated Aug. 14, 2019.

* cited by examiner

US 10,650,031 B2

SYSTEMS AND METHODS FOR VISUALIZATION OF DATA ANALYSIS

CROSS REFERENCE TO RELATED APPLICATIONS

This application is a continuation of U.S. patent application Ser. No. 12/703,165, filed on Feb. 9, 2010, entitled "Systems and Methods for Visualization of Data Analysis," which claims priority to U.S. Provisional Application Ser. No. 61/151,488, filed Feb. 10, 2009, entitled "Mapper: an Environment for Visual data Analysis," which are hereby incorporated by reference herein.

BACKGROUND

1. Field of the Invention

Embodiments of the present invention are directed to visualization of data analysis and more particularly to displaying an interactive visualization of the analysis.

2. Related Art

As the collection and storage data has increased, there is an increased need to analyze and make sense of large amounts of data. Examples of large datasets may be found in financial services companies, oil expiration, biotech, and academia. Unfortunately, previous methods of analysis of large multidimensional datasets tend to be insufficient (if possible at all) to identify important relationships and may be computationally inefficient.

In one example, previous methods of analysis often use clustering. Clustering is often too blunt an instrument to identify important relationships in the data. Similarly, previous methods of linear regression, projection pursuit, principal component analysis, and multidimensional scaling often do not reveal important relationships. Existing linear algebraic and analytic methods are too sensitive to large scale distances and, as a result, lose detail.

Further, even if the data is analyzed, sophisticated experts are often necessary to interpret and understand the output of previous methods. Although some previous methods allow graphs depicting some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION

Exemplary systems and methods for visualization of data analysis are provided. In various embodiments, a method comprises accessing a database, analyzing the database to identify clusters of data, generating an interactive visualization comprising a plurality of nodes and a plurality of edges wherein a first node of the plurality of nodes represents a cluster and an edge of the plurality of edges represents an intersection of nodes of the plurality of nodes, selecting and dragging the first node in response to a user action, and reorienting the interactive visualization in response to the user action of selecting and dragging the first node.

In various embodiments, the method further comprises saving the data in the database associated with the selected first node. The method may comprise selecting a second node and displaying information regarding the first and second node. In some embodiments, the method may comprise receiving a selection of data identifiers of the database and highlighting some of the plurality of nodes associated with the selection.

The first node and a second node of the interactive visualization may be colored differently based on a selected first function. In one example, the first function is a filter. The method may further comprise receiving a second function selection and changing the color of the first and second nodes based on the second function selection.

In various embodiments, the method further comprises receiving an interval value and an overlap percentage, re-analyzing the database based on the interval value and the overlap percentage, and regenerating the interactive visualization based on the re-analysis. Further, the method may comprise displaying movement of the interactive visualization after generation, the movement being based on visual optimization of the plurality of nodes.

In some embodiments, the method may further comprise displaying statistical information about the first node and a selected second node. The analysis of the database may be a topological analysis. In some embodiments, the analysis of the database is a nonlinear data analysis.

An exemplary system comprises a processor, an input module, an analysis module, and a visualization module. The input module may be configured to access a database. The analysis module may be configured to analyze the database to identify clusters of data. The visualization module may be configured to generate an interactive visualization comprising a plurality of nodes and a plurality of edges, wherein a first node of the plurality of nodes represents a cluster and an edge of the plurality of edges represents an intersection between nodes of the plurality of nodes, to select and drag the first node in response to a user action, and to reorient the interactive visualization in response to the user action of selecting and dragging the first node.

An exemplary computer readable medium may comprise instructions. The instructions may be executable by a processor to perform a method. The method may comprise accessing a database, analyzing the database to identify clusters of data, generating an interactive visualization comprising a plurality of nodes and a plurality of edges wherein a first node of the plurality of nodes represents a cluster and an edge of the plurality of edges represents an intersection of nodes of the plurality of nodes, selecting and dragging the first node in response to a user action, and reorienting the interactive visualization in response to a user action of selecting and dragging the first node.

DETAILED DESCRIPTION OF EXEMPLARY EMBODIMENTS

In various embodiments, a system for handling, analyzing, and visualizing data using drag and drop methods as opposed to text based methods is described herein. Philosophically, data analytic tools are not necessarily regarded as "solvers," but rather as tools for interacting with data. For example, data analysis may consist of several iterations of a process in which computational tools point to regions of interest in a data set. The data set may then be examined by people with domain expertise concerning the data, and the data set may then be subjected to further computational analysis. In some embodiments, methods described herein provide for going back and forth between mathematical constructs, including interactive visualizations (e.g., graphs), on the one hand and data on the other.

In one example of data analysis in some embodiments described herein, an exemplary clustering tool is discussed which may be more powerful than existing technology, in that one can find structure within clusters and study how clusters change over a period of time or over a change of scale or resolution.

An exemplary interactive visualization tool (e.g., a visualization module which is further described herein) may produce combinatorial output in the form of a graph which can be readily visualized. In some embodiments, the exemplary interactive visualization tool may be less sensitive to changes in notions of distance than current methods, such as multidimensional scaling.

Some embodiments described herein permit manipulation of the data from a visualization. For example, portions of the data which are deemed to be interesting from the visualization can be selected and converted into database objects, which can then be further analyzed. Some embodiments described herein permit the location of data points of interest within the visualization, so that the connection between a given visualization and the information the visualization represents may be readily understood.

Figure 1:
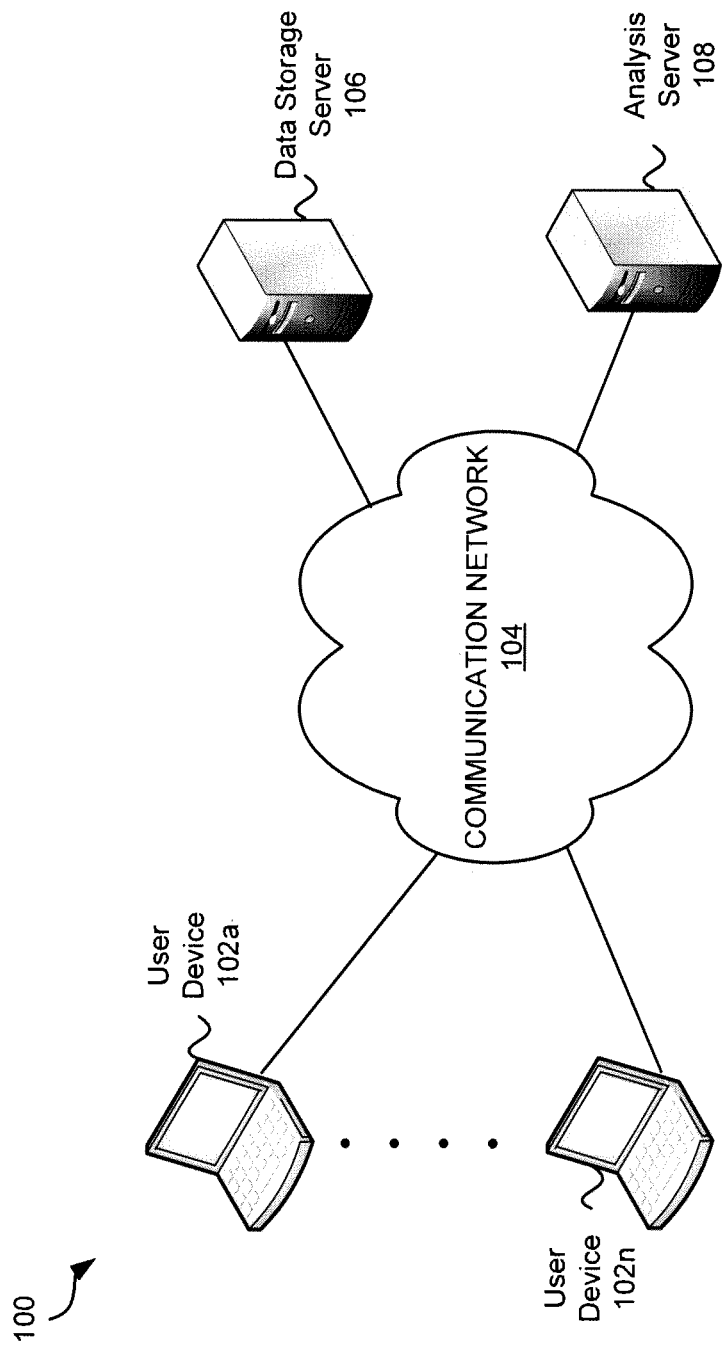
FIG. 1 is an exemplary environment in which embodiments may be practiced.

FIG. 1 is an exemplary environment 100 in which embodiments may be practiced.

In various embodiments, data analysis and interactive visualization may be performed locally (e.g., with software and/or hardware on a local digital device), across a network (e.g., via cloud computing), or a combination of both. In many of these embodiments, a data structure is accessed to obtain the data for the analysis, the analysis is performed based on properties and parameters selected by a user, and an interactive visualization is generated and displayed. There are many advantages between performing all or some activities locally and many advantages of performing all or some activities over a network.

Environment 100 comprises user devices 102*a*-102*n*, a communication network 104, data storage server 106, and analysis server 108. Environment 100 depicts an embodiment wherein functions are performed across a network. In this example, the user(s) may take advantage of cloud computing by storing data in a data storage server 106 over a communication network 104. The analysis server 108 may perform analysis and generation of an interactive visualization.

User devices 102*a*-102*n* may be any digital devices. A digital device is any device that comprises memory and a processor. Digital devices are further described in FIG. 2. The user devices 102*a*-102*n* may be any kind of digital device that may be used to access, analyze and/or view data including, but not limited to a desktop computer, laptop, notebook, or other computing device.

In various embodiments, a user, such as a data analyst, may generate a database or other data structure with the user device 102*a* to be saved to the data storage server 106. The user device 102*a* may communicate with the analysis server 108 via the communication network 104 to perform analysis, examination, and visualization of data within the database.

The user device 102*a* may comprise a client program for interacting with one or more applications on the analysis server 108. In other embodiments, the user device 102*a* may communicate with the analysis server 108 using a browser or other standard program. In various embodiments, the user device 102*a* communicates with the analysis server 108 via a virtual private network. Those skilled in the art will appreciate that that communication between the user device 102*a*, the data storage server 106, and/or the analysis server 108 may be encrypted or otherwise secured.

The communication network 104 may be any network that allows digital devices to communicate. The communication network 104 may be the Internet and/or include LAN and WANs. The communication network 104 may support wireless and/or wired communication.

The data storage server 110 is a digital device that is configured to store data. In various embodiments, the data storage server 110 stores databases and/or other data structures. The data storage server 110 may be a single server or a combination of servers. In one example the data storage server 110 may be a secure server wherein a user may store data over a secured connection (e.g., via https). The data may be encrypted and backed-up. In some embodiments, the data storage server 106 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 108 is a digital device that may be configured to analyze data. In various embodiments, the analysis server may perform many functions to interpret, examine, analyze, and display data and/or relationships within data. In some embodiments, the analysis server 108 performs, at least in part, topological analysis of large datasets applying metrics, filters, and resolution parameters chosen by the user. The analysis is further discussed in FIG. 8 herein.

The analysis server 108 may generate an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 108 may also allow for the user to interact with the data, see the graphic result. The interactive visualization is further discussed in FIGS. 9-11.

In some embodiments, the analysis server 108 interacts with the user device(s) 102a-102n over a private and/or secure communication network. The user device 102a may comprise a client program that allows the user to interact with the data storage server 106, the analysis server 108, another user device (e.g., user device 102n), a database, and/or an analysis application executed on the analysis server 108.

Those skilled in the art will appreciate that all or part of the data analysis may occur at the user device 102a. Further, all or part of the interaction with the visualization (e.g., graphic) may be performed on the user device 102a.

Although two user devices 102a and 102n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, those skilled in the art will appreciate that services and computing resources offered to the user(s) may be scalable.

Figure 2:
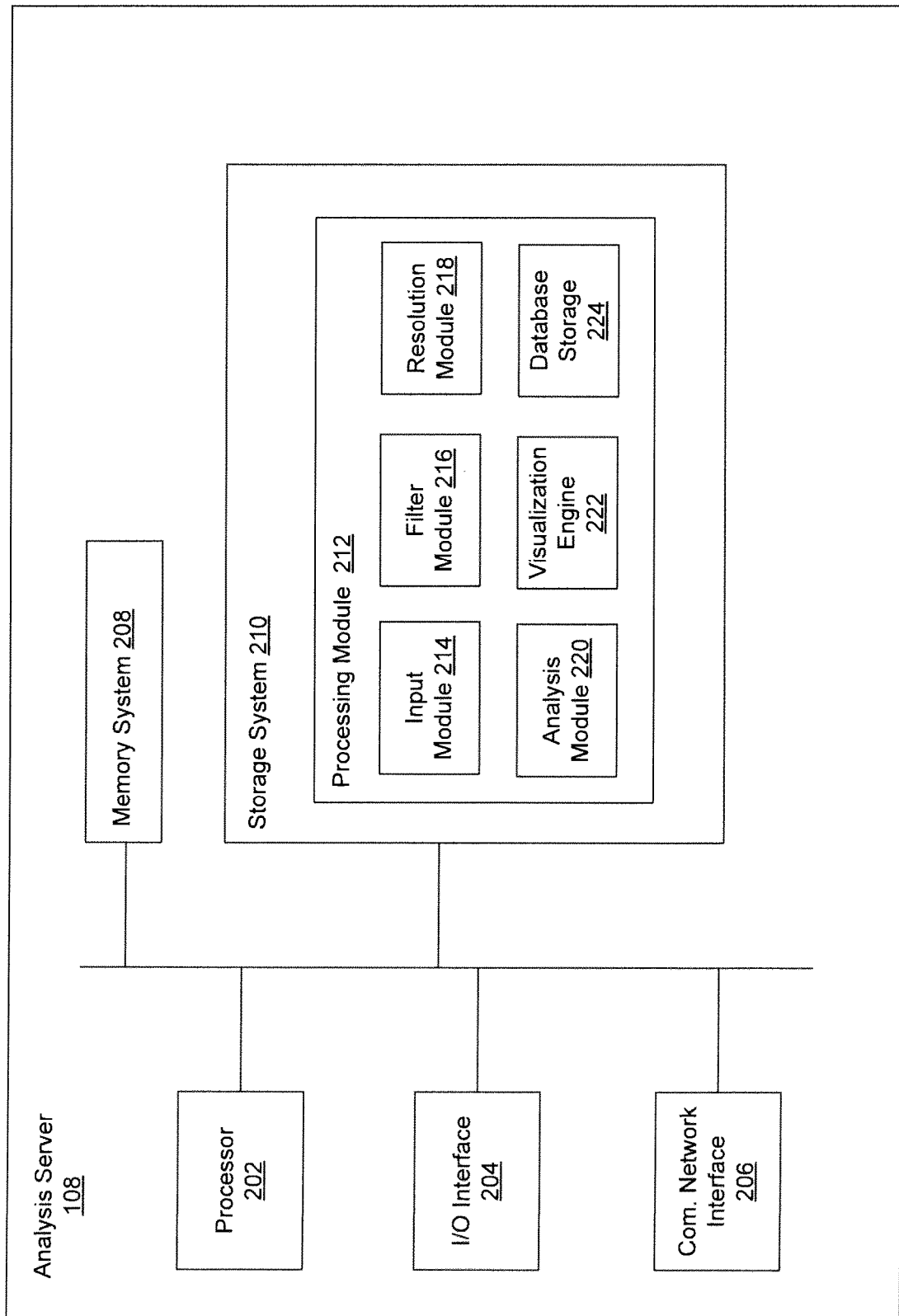
FIG. 2 is a block diagram of an exemplary analysis server.

FIG. 2 is a block diagram of an exemplary analysis server 108. In exemplary embodiments, the analysis server 108 comprises a processor 202, input/output (I/O) interface 204, a communication network interface 206, a memory system 208, and a storage system 210. The processor 202 may comprise any processor or combination of processors with one or more cores.

The input/output (I/O) device 204 may comprise interfaces for various I/O devices such as, for example, a keyboard, mouse, and display device. The exemplary communication network interface 206 is configured to allow the analysis server 108 to communication with the communication network 104 (see FIG. 1). The communication network interface 206 may support communication over an Ethernet connection, a serial connection, a parallel connection, and/or an ATA connection. The communication network interface 206 may also support wireless communication (e.g., 802.11a/b/g/n, WiMax, LTE, WiFi). It will be apparent to those skilled in the art that the communication network interface 206 can support many wired and wireless standards.

The memory system 208 may be any kind of memory including RAM, ROM, or flash, cache, virtual memory, etc. In various embodiments, working data is stored within the memory system 208. The data within the memory system 208 may be cleared or ultimately transferred to the storage system 210.

The storage system 210 includes any storage configured to retrieve and store data. Some examples of the storage system 210 include flash drives, hard drives, optical drives, and/or magnetic tape. Each of the memory system 208 and the storage system 210 comprises a computer-readable medium, which stores instructions (e.g., software programs) executable by processor 202.

The storage system 210 comprises a plurality of modules utilized by embodiments of the present invention. A module may be hardware, software (e.g., including instructions executable by a processor), or a combination of both. In one embodiment, the storage system 210 comprises a processing module 212 which comprises an input module 214, a filter module 216, a resolution module 218, an analysis module 220, a visualization engine 222, and database storage 224. Alternative embodiments of the analysis server 108 and/or the storage system 210 may comprise more, less, or functionally equivalent components and modules.

The input module 214 may be configured to receive commands and preferences from the user device 102a. In various examples, the input module 214 receives selections from the user which will be used to perform the analysis. The output of the analysis may be an interactive visualization.

The input module 214 may provide the user a variety of interface windows allowing the user to select and access a database, choose fields associated with the database, choose a metric, choose one or more filters, and identify resolution parameters for the analysis. In one example, the input module 214 receives a database identifier and accesses a large multidimensional database. The input module 214 may scan the database and provide the user with an interface window allowing the user to identify an ID field. An ID field is an identifier for each data point. In one example, the identifier is unique. The same column name may be present in the table from which filters are selected. After the ID field is selected, the input module 214 may then provide the user with another interface window to allow the user to choose one or more data fields from a table of the database.

Although interactive windows may be described herein, those skilled in the art will appreciate that any window, graphical user interface, and/or command line may be used to receive or prompt a user or user device 102a for information.

The filter module 216 may subsequently provide the user with an interface window to allow the user to select a metric to be used in analysis of the data within the chosen data fields. The filter module 216 may also allow the user to select and/or define one or more filters.

The resolution module 218 may allow the user to select a resolution, including filter parameters. In one example, the user enters a number of intervals and a percentage overlap for a filter.

The analysis module 220 may perform data analysis based on the database and the information provided by the user. In various embodiments, the analysis module 220 performs an algebraic topological analysis to identify structures and relationships within data and clusters of data. Those skilled in the art will appreciate that the analysis module 220 may use parallel algorithms or use generalizations of various statistical techniques (e.g., generalizing the bootstrap to zig-zag methods) to increase the size of data sets that can be processed. The analysis is further discussed in FIG. 8. Those skilled in the art will appreciate that the analysis module 220 is not limited to algebraic topological analysis but may perform any analysis.

The visualization engine 222 generates an interactive visualization including the output from the analysis module 220. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11.

The database storage 224 is configured to store all or part of the database that is being accessed. In some embodiments, the database storage 224 may store saved portions of the database. Further, the database storage 224 may be used to store user preferences, parameters, and analysis output thereby allowing the user to perform many different functions on the database without losing previous work.

Those skilled in the art will appreciate that that all or part of the processing module 212 may be at the user device 102a or the database storage server 106. In some embodiments, all or some of the functionality of the processing module 212 may be performed by the user device 102a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

Figure 3:
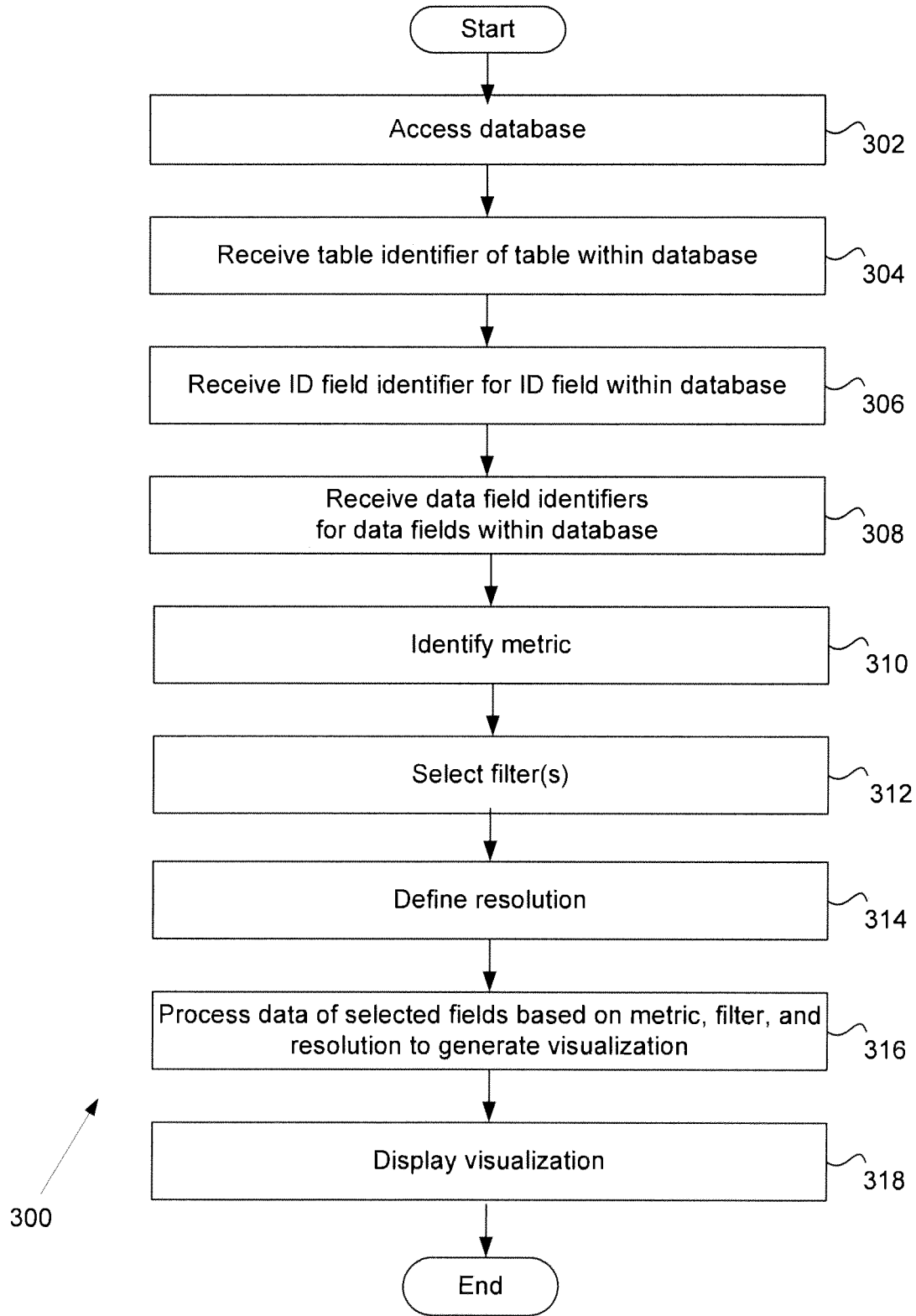
FIG. 3 is a flow chart depicting an exemplary method of dataset analysis and visualization in some embodiments.

FIG. 3 is a flow chart 300 depicting an exemplary method of dataset analysis and visualization in some embodiments. In step 302, the input module 214 accesses a database. The database may be any data structure containing data (e.g., a very large dataset of multidimensional data). In some embodiments, the database may be a relational database. In some examples, the relational database may be used with MySQL, Oracle, Micosoft SQL Server, Aster nCluster, Teradata, and/or Vertica. Those skilled in the art will appreciate that the database may not be a relational database.

In some embodiments, the input module 214 receives a database identifier and a location of the database (e.g., the data storage server 106) from the user device 102a (see FIG. 1). The input module 214 may then access the identified database. In various embodiments, the input module 214 may read data from many different sources, including, but not limited to MS Excel files, text files (e.g., delimited or CSV), Matlab .mat format, or any other file.

In some embodiments, the input module 214 receives an IP address or hostname of a server hosting the database, a username, password, and the database identifier. This information (herein referred to as "connection information") may be cached for later use. Those skilled in the art will appreciate that the database may be locally accessed and that all, some, or none of the connection information may be required. In one example, the user device 102a may have full access to the database stored locally on the user device 102a so the IP address is unnecessary. In another example, the user device 102a may already have loaded the database and the input module 214 merely begins by accessing the loaded database.

In various embodiments, the identified database stores data within tables. A table may have a "column specification" which stores the names of the columns and their data types. A "row" in a table, may be a tuple with one entry for each column of the correct type. In one example, a table to store employee records might have a column specification such as:

employee_id primary key int (this may store the employee's ID as an integer, and uniquely identifies a row)
    age int
    gender char(1) (gender of the employee may be a single character either M or F)
    salary double (salary of an employee may be a floating point number)
    name varchar (name of the employee may be a variable-length string)

In this example, each employee corresponds to a row in this table. Further, the tables in this exemplary relational database are organized into logical units called databases. An analogy to file systems is that databases can be thought of as folders and files as tables. Access to databases may be controlled by the database administrator by assigning a username/password pair to authenticate users.

Once the database is accessed, the input module 214 may allow the user to access a previously stored analysis or to begin a new analysis. If the user begins a new analysis, the input module 214 may provide the user device 102a with an interface window allowing the user to identify a table from within the database. In one example, the input module 214 provides a list of available tables from the identified database.

In step 304, the input module 214 receives a table identifier identifying a table from within the database. The input module 214 may then provide the user with a list of available ID fields from the table identifier. In step 306, the input module 214 receives the ID field identifier from the user and/or user device 102a. The ID field is, in some embodiments, the primary key.

Having selected the primary key, the input module 214 may generate a new interface window to allow the user to select data fields for analysis. In step 308, the input module 214 receives data field identifiers from the user device 102a. The data within the data fields may be later analyzed by the analysis module 220.

In step 310, the filter module 216 identifies a metric. In some embodiments, the filter module 216 and/or the input module 214 generates an interface window allowing the user of the user device 102a options for a variety of different metrics and filter preferences. The interface window may be a drop down menu identifying a variety of distance metrics to be used in the analysis. Metric options may include, but are not limited to, Euclidean, DB Metric, variance normalized Euclidean, and total normalized Euclidean. The metric and the analysis are further described herein.

In step 312, the filter module 216 selects one or more filters. In some embodiments, the user selects and provides filter identifier(s) to the filter module 216. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:

Density
    L1 Eccentricity
    L-infinity Eccentricity
    Witness based Density
    Witness based Eccentricity
    Eccentricity as distance from a fixed point
    Approximate Kurtosis of the Eccentricity In step 314, the resolution module 218 defines the resolution to be used with a filter in the analysis. The resolution may comprise a number of intervals and an overlap parameter. In various embodiments, the resolution module 218 allows the user to adjust the number of intervals and overlap parameter (e.g., percentage overlap) for one or more filters.

In step 316, the analysis module 220 processes data of selected fields based on the metric, filter(s), and resolution(s) to generate the visualization. This process is discussed in FIG. 8.

In step 318, the visualization module 222 displays the interactive visualization. In various embodiments, the visualization may be rendered in two or three dimensional space. The visualization module 222 may use an optimization algorithm for an objective function which is correlated with good visualization (e.g., the energy of the embedding). The visualization may show a collection of nodes corresponding to each of the partial clusters in the analysis output and edges connecting them as specified by the output. The interactive visualization is further discussed in FIGS. 9-11.

Although many examples discuss the input module 214 as providing interface windows, those skilled in the art will appreciate that all or some of the interface may be provided by a client on the user device 102a. Further, in some embodiments, the user device 102a may be running all or some of the processing module 212.

FIGS. 4-7 depict various interface windows to allow the user to make selections, enter information (e.g., fields, metrics, and filters), provide parameters (e.g., resolution), and provide data (e.g., identify the database) to be used with analysis. Those skilled in the art will appreciate that any graphical user interface or command line may be used to make selections, enter information, provide parameters, and provide data.

Figure 4:
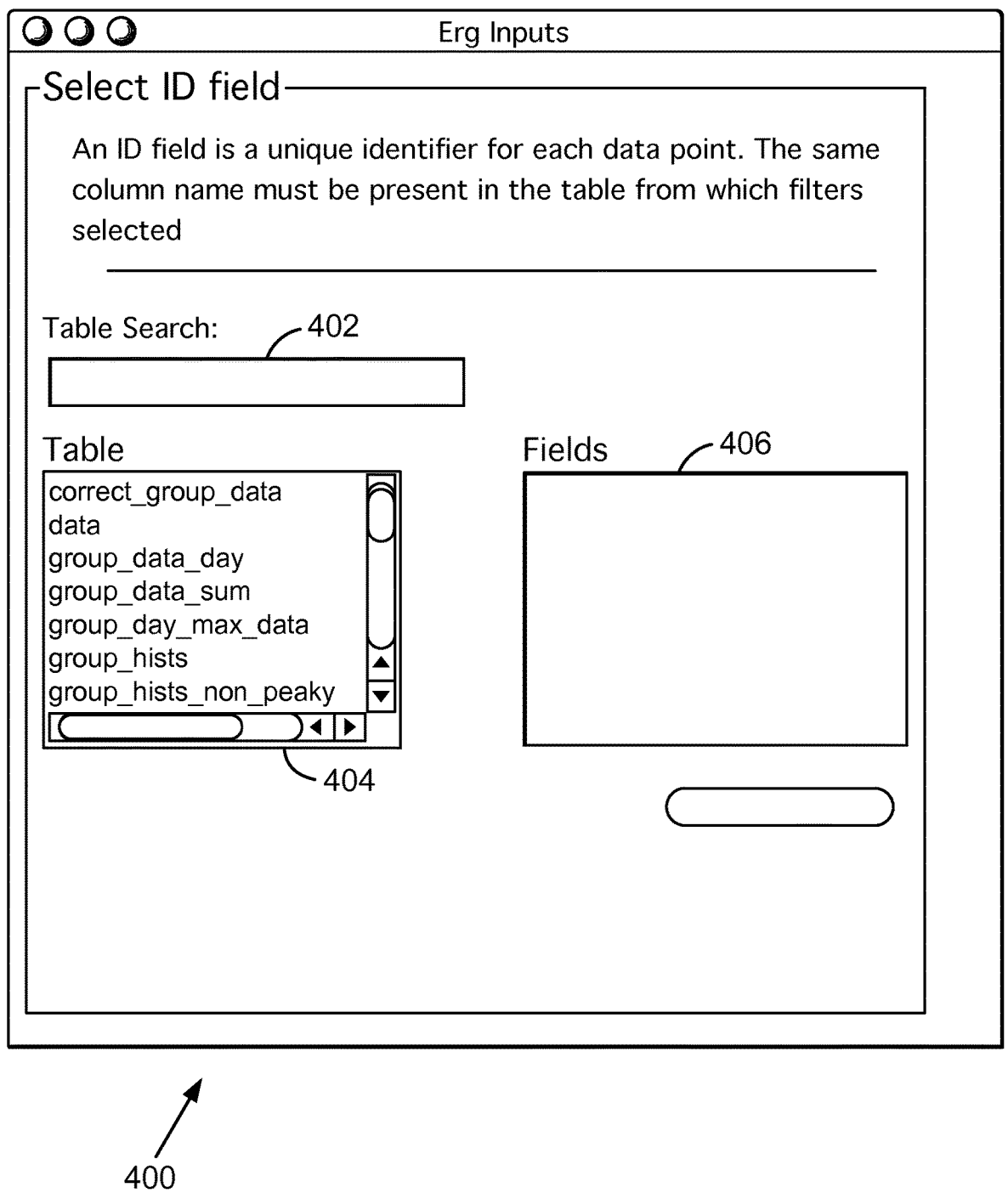
FIG. 4 is an exemplary ID field selection interface window in some embodiments.

FIG. 4 is an exemplary ID field selection interface window 400 in some embodiments. The ID field selection interface window 400 allows the user to identify an ID field. The ID field selection interface window 400 comprises a table search field 402, a table list 404, and a fields selection window 406.

In various embodiments, the input module 214 identifies and accesses a database from the database storage 224, user device 102a, or the data storage server 106. The input module 214 may then generate the ID field selection interface window 400 and provide a list of available tables of the selected database in the table list 404. The user may click on a table or search for a table by entering a search query (e.g., a keyword) in the table search field 402. Once a table is identified (e.g., clicked on by the user), the fields selection window 406 may provide a list of available fields in the selected table. The user may then choose a field from the fields selection window 406 to be the ID field. In some embodiments, any number of fields may be chosen to be the ID field(s).

Figure 5:
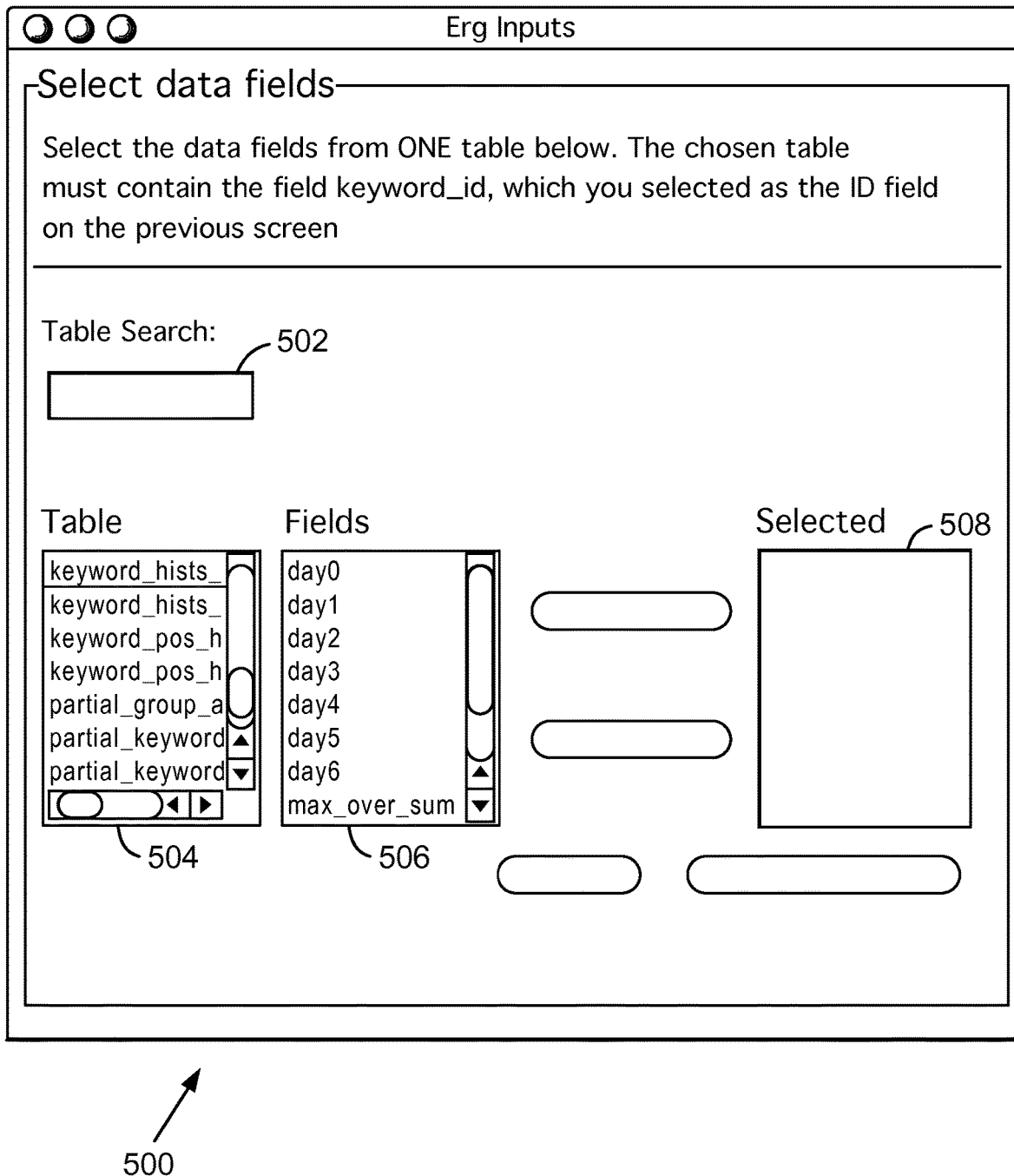
FIG. 5 is an exemplary data field selection interface window in some embodiments.

FIG. 5 is an exemplary data field selection interface window 500 in some embodiments. The data field selection interface window 500 allows the user to identify data fields. The data field selection interface window 500 comprises a table search field 502, a table list 504, a fields selection window 506, and a selected window 508.

In various embodiments, after selection of the ID field, the input module 214 provides a list of available tables of the selected database in the table list 504. Similar to the table search field 402 in FIG. 4, the user may click on a table or search for a table by entering a search query (e.g., a keyword) in the table search field 502. Once a table is identified (e.g., clicked on by the user), the fields selection window 506 may provide a list of available fields in the selected table. The user may then choose any number of fields from the fields selection window 506 to be data fields. The selected data fields may appear in the selected window 508. The user may also deselect fields that appear in the selected window 508.

Those skilled in the art will appreciate that the table selected by the user in the table list 504 may be the same table selected with regard to FIG. 4. In some embodiments, however, the user may select a different table. Further, the user may, in various embodiments, select fields from a variety of different tables.

Figure 6:
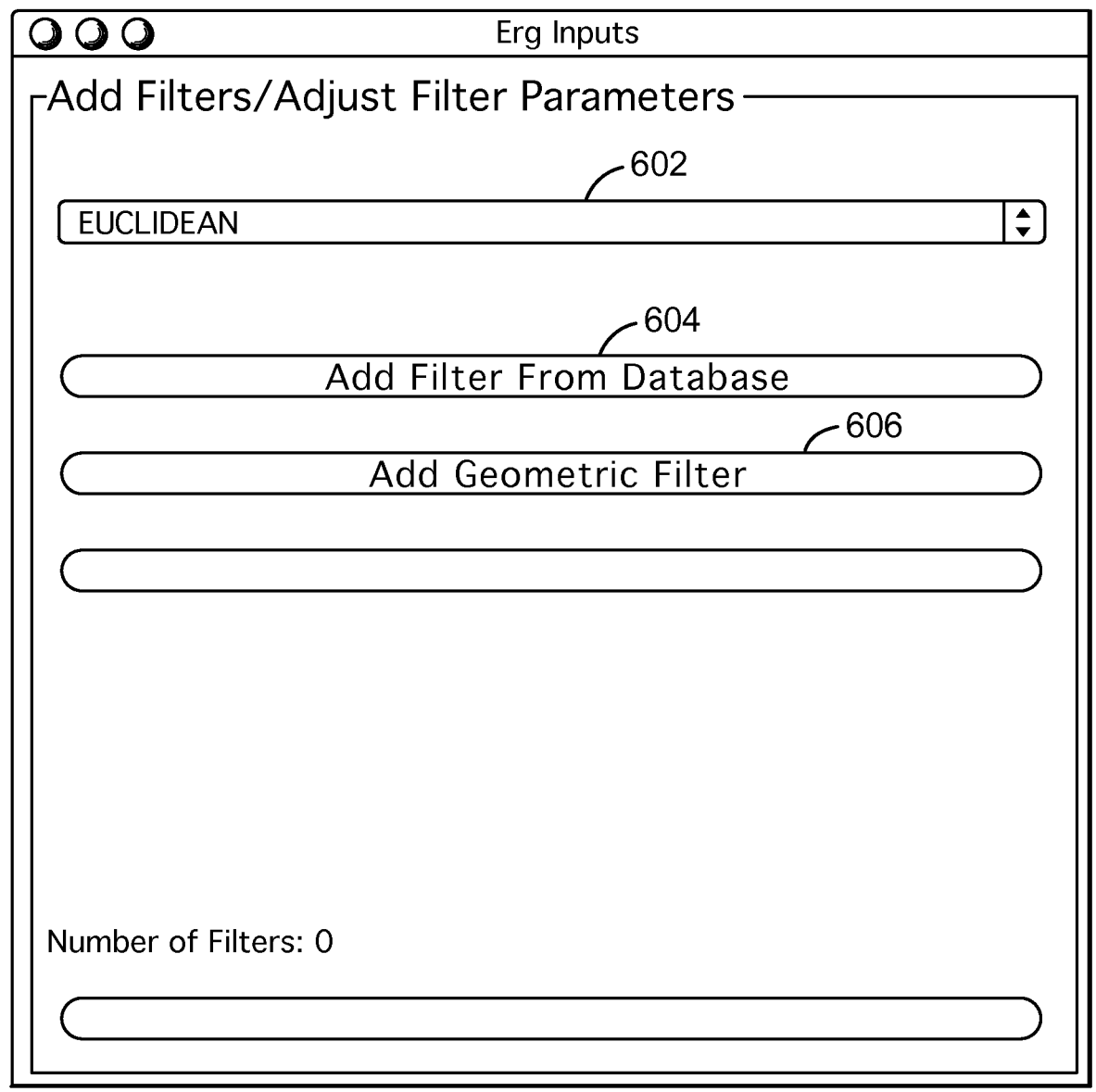
FIG. 6 is an exemplary metric and filter selection interface window in some embodiments.

FIG. 6 is an exemplary metric and filter selection interface window 600 in some embodiments. The metric and filter selection interface window 600 allows the user to identify a metric, add filter(s), and adjust filter parameters. The metric and filter selection interface window 600 comprises a metric pull down menu 602, an add filter from database button 604, and an add geometric filter button 606.

In various embodiments, the user may click on the metric pull down menu 602 to view a variety of metric options. Various metric options are described herein. In some embodiments, the user may define a metric. The user defined metric may then be used with the analysis.

In one example, finite metric space data may be constructed from a data repository (i.e., database, spreadsheet, or Matlab file). This may mean selecting a collection of fields whose entries will specify the metric using the standard Euclidean metric for these fields, when they are floating point or integer variables. Other notions of distance, such as graph distance between collections of points, may be supported.

The analysis module 220 may perform analysis using the metric as a part of a distance function. The distance function can be expressed by a formula, a distance matrix, or other routine which computes it. The user may add a filter from a database by clicking on the add filter from database button 604. The metric space may arise from a relational database, a Matlab file, an Excel spreadsheet, or other methods for storing and manipulating data. The metric and filter selection interface window 600 may allow the user to browse for other filters to use in the analysis. The analysis and metric function are further described in FIG. 8.

The user may also add a geometric filter 606 by clicking on the add geometric filter button 606. In various embodiments, the metric and filter selection interface window 600 may provide a list of geometric filters from which the user may choose.

Figure 7:
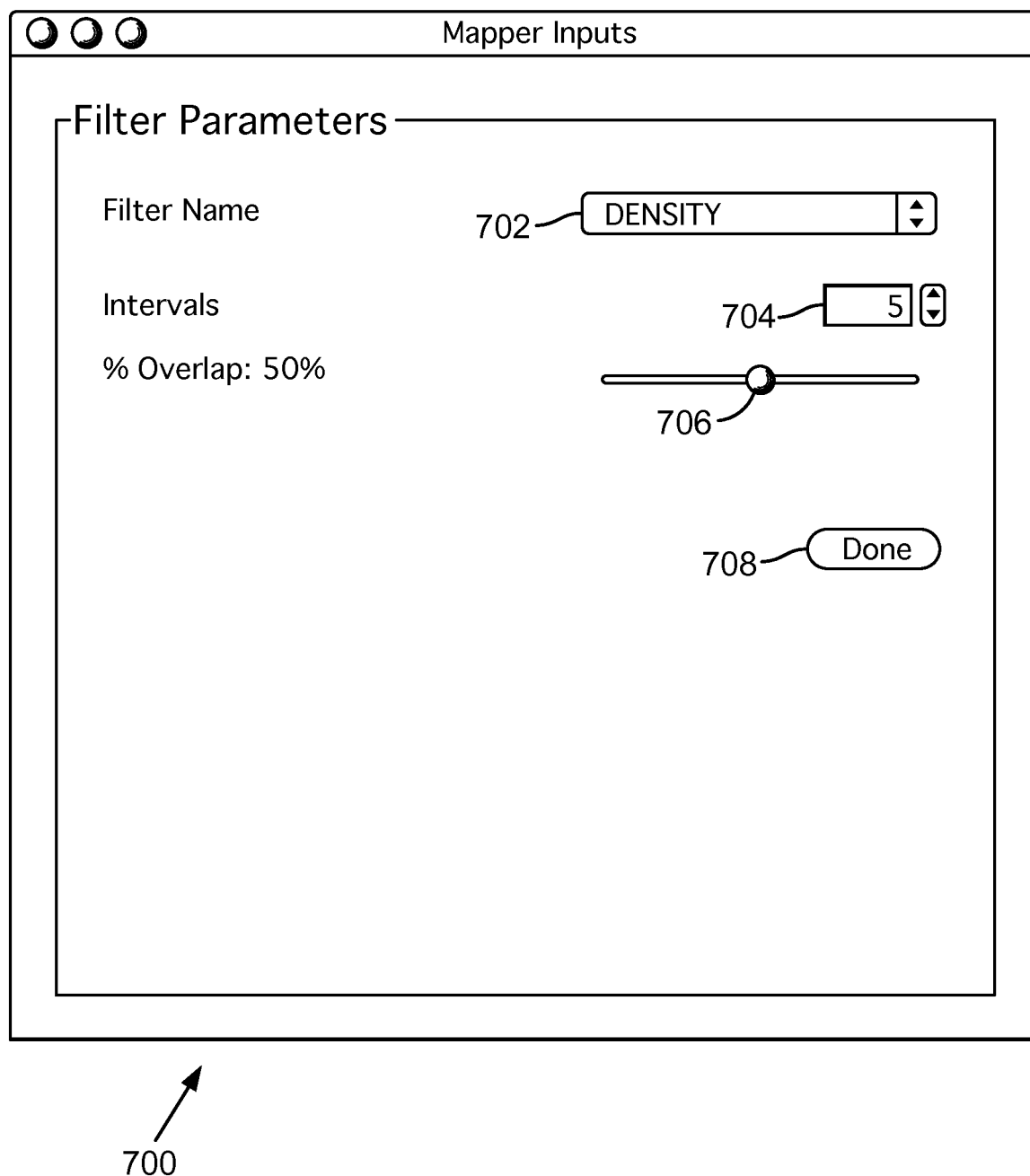
FIG. 7 is an exemplary filter parameter interface window in some embodiments.

FIG. 7 is an exemplary filter parameter interface window 700 in some embodiments. The filter parameter interface window 700 allows the user to determine a resolution for one or more selected filters (e.g., filters selected in the metric and filter selection interface window 600). The filter parameter interface window 700 comprises a filter name menu 702, an interval field 704, an overlap bar 706, and a done button 708.

The filter parameter interface window 700 allows the user to select a filter from the filter name menu 702. In some embodiments, the filter name menu 702 is a drop down box indicating all filters selected by the user in the metric and filter selection interface window 600. Once a filter is chosen, the name of the filter may appear in the filter name menu 702. The user may then change the intervals and overlap for one, some, or all selected filters.

The interval field 704 allows the user to define a number of intervals for the filter identified in the filter name menu 702. The user may enter a number of intervals or scroll up or down to get to a desired number of intervals. Any number of intervals may be selected by the user. The function of the intervals is further discussed in FIG. 8.

The overlap bar 706 allows the user to define the degree of overlap of the intervals for the filter identified in the filter name menu 702. In one example, the overlap bar 706 includes a slider that allows the user to define the percentage overlap for the interval to be used with the identified filter. Any percentage overlap may be set by the user.

Once the intervals and overlap are defined for the desired filters, the user may click the done button. The user may then go back to the metric and filter selection interface window 600 and see a new option to run the analysis. In some embodiments, the option to run the analysis may be available in the filter parameter interface window 700. Once the analysis is complete, the result may appear in an interactive visualization which is further described in FIGS. 9-11.

Those skilled in the art will appreciate that that interface windows in FIGS. 4-7 are exemplary. The exemplary interface windows are not limited to the functional objects (e.g., buttons, pull down menus, scroll fields, and search fields) shown. Any number of different functional objects may be used. Further, as described herein, any other interface, command line, or graphical user interface may be used.

Figure 8:
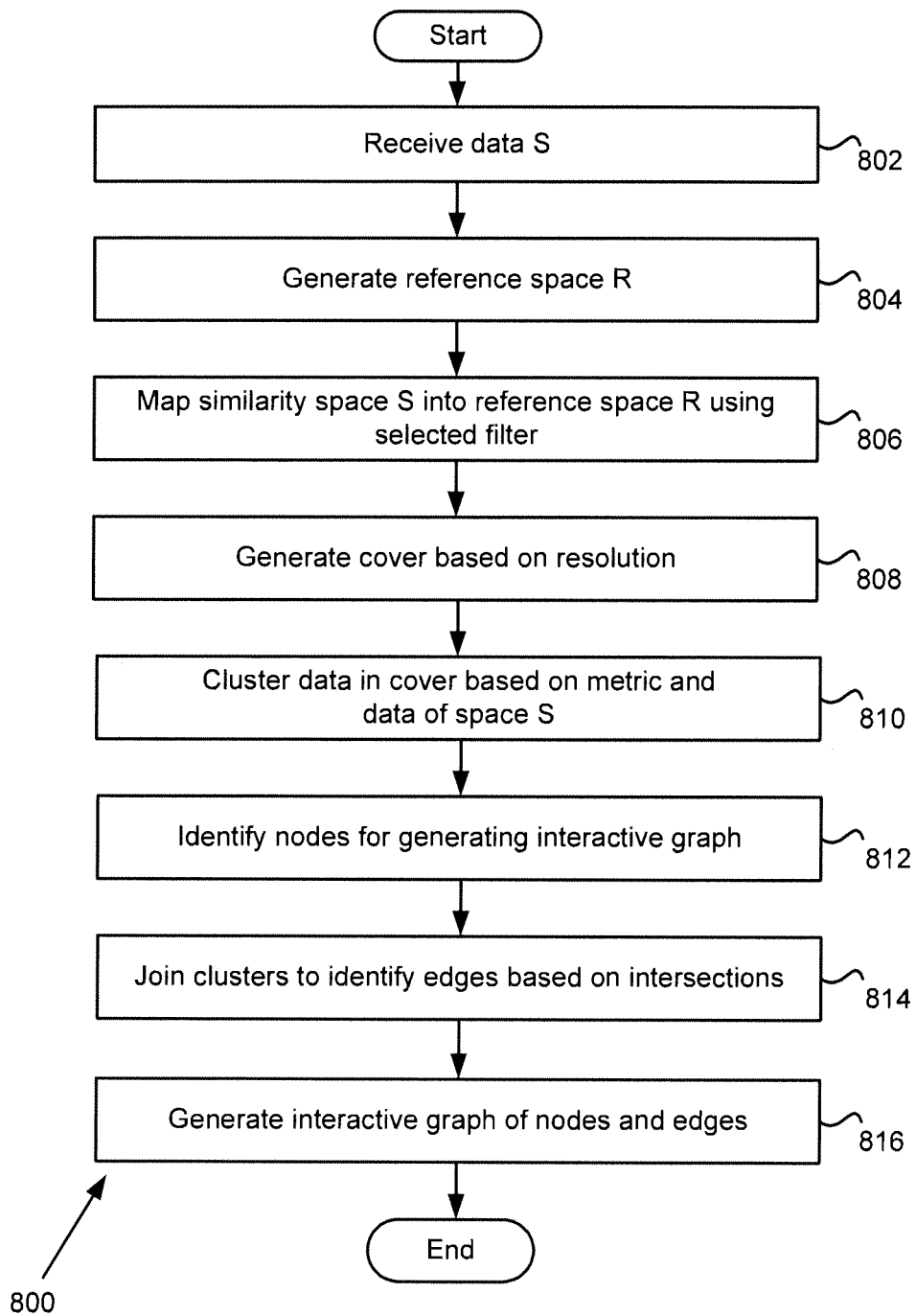
FIG. 8 is a flowchart for data analysis and generating a visualization in some embodiments.

FIG. 8 is a flowchart 800 for data analysis and generating an interactive visualization in some embodiments. In various embodiments, the processing on data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data, user options, and even to errors in the specific details of the qualitative measure of similarity, which, in some embodiments, may be generally refer to as "the distance function" or "metric." Those skilled in the art will appreciate that while the description of the algorithms below may seem general, the implementation of techniques described herein may apply to any level of generality.

In step 802, the input module 214 receives data S. In one example, a user identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$$d(s,s)=0$$

$$d(s,t)=d(t,s)$$

$$d(s,t)>=0$$

These conditions may be similar to requirements for a finite metric space, but the conditions may be weaker. In various examples, the function is a metric.

Those skilled in the art will appreciate that data S may be a finite metric space, or a generalization thereof, such as a graph or weighted graph. In some embodiments, data S may be specified by a formula, an algorithm, or by a distance matrix which specifies explicitly every pairwise distance.

In step 804, the input module 214 generates reference space R. In one example, reference space R may be a well-known metric space (e.g., such as the real line). The reference space R may be defined by the user. In step 806, the analysis module 220 generates a map ref( ) from S into R. The map ref( ) from S into R may be called the "reference map."

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 808, the resolution module 218 generates a cover of R based on the resolution received from the user (e.g., filter(s), intervals, and overlap—see FIG. 7). The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1, 0), (1, 0), (−1, 5), (1, 5), as every point s of S will give rise to a pair (F1(s), F2(s)) that lies within that rectangle.

In various embodiments, the cover of R is given by taking products of intervals of the covers of [min_k, max_k] for each of the k filters. In one example, if the user requests 2 intervals and a 50% overlap for F1, the cover of the interval [−1, +1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3, 1.3). Supposing that was labeled $C_1$, the reference map may assign s to the set {1}. On the other hand, if t is mapped by F1, F2 to (0.1, 2.1), then ref(t) will be in (−1.5, 0.5)×(0.7, 2.3), (−0.5, 1.5)×(0.7, 2.3), (−1.5, 0.5)×(1.7, 3.3), and (−0.5, 1.5)×(1.7, 3.3), so the set of indices would have four elements for t.

Having computed, for each point, which "cover tags" it is assigned to, for each cover element, $C_d$, the points may be constructed, whose tags include d, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

Those skilled in the art will appreciate that the cover of the reference space R may be controlled by the number of intervals and the overlap identified in the resolution (e.g., see FIG. 7). For example, the more intervals, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 810, the analysis module 220 clusters each S(d) based on the metric, filter, and the space S. In some embodiments, a dynamic single-linkage clustering algorithm may be used to partition S(d). Those skilled in the art will appreciate that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 220 may not cluster two points unless ALL of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 812, the visualization engine 222 identifies nodes which are associated with a subset of the partition elements of all of the S(d) for generating an interactive visualization. For example, suppose that S={1, 2, 3, 4}, and the cover is $C_1, C_2, C_3$. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1, 2}, and S(3)={1, 2, 3, 4}. If 1 and 2 are close enough to be clustered, and 3 and 4 are, but nothing else, then the clustering for S(1) may be {1} {3}, and for S(2) it may be {1, 2} and for S(3) it may be {1, 2}, {3, 4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers, for instance, clusters with too few people in area codes served by a company could be eliminated. If a cluster was found with "enough" customers, however, this might indicate that expansion into area codes of the other consumers in the cluster could be warranted.

In step 814, the visualization engine 222 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an int[ ]. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 10:
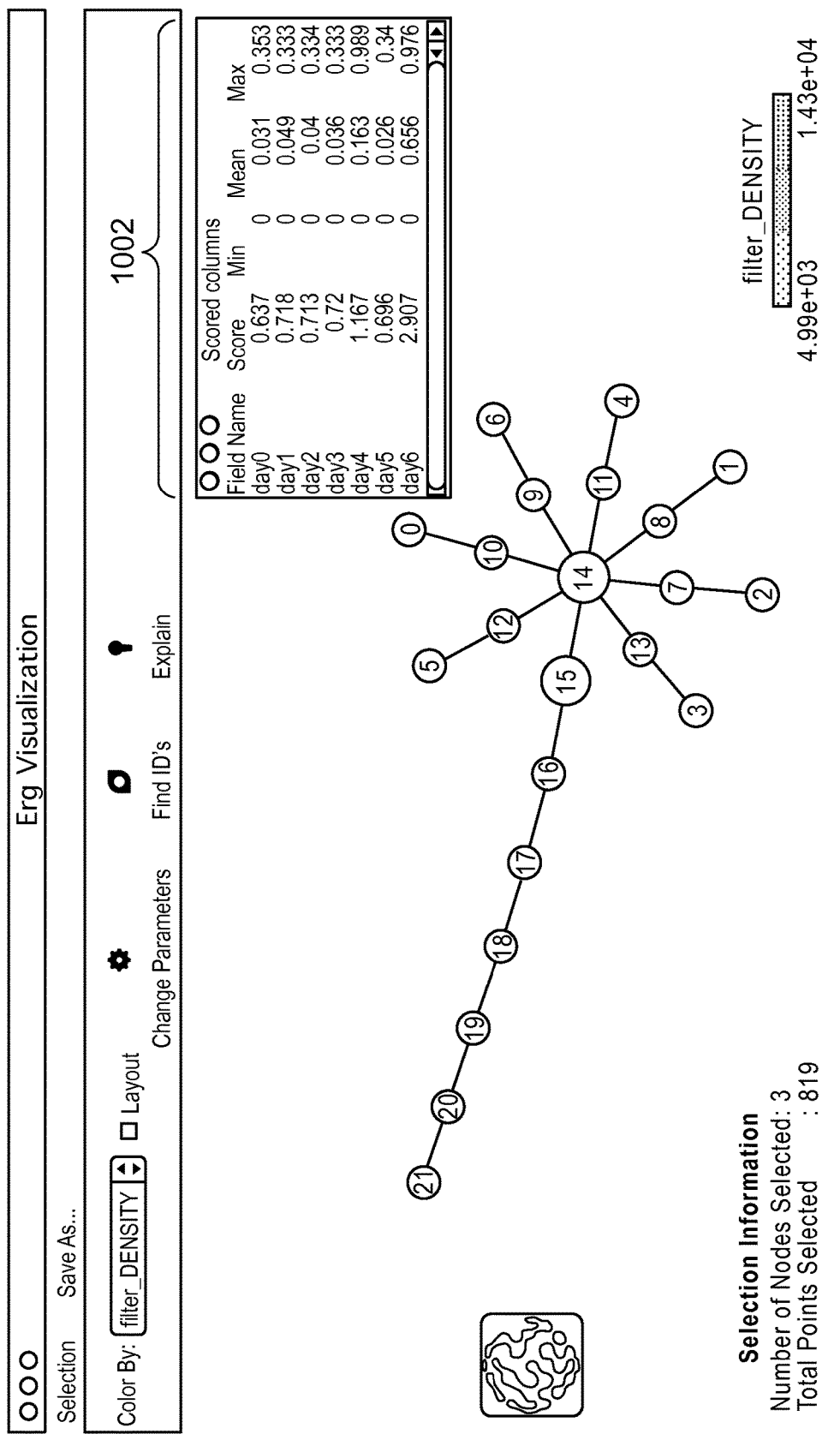
FIG. 10 is an exemplary interactive visualization displaying an explain information window in some embodiments.
Figure 11:
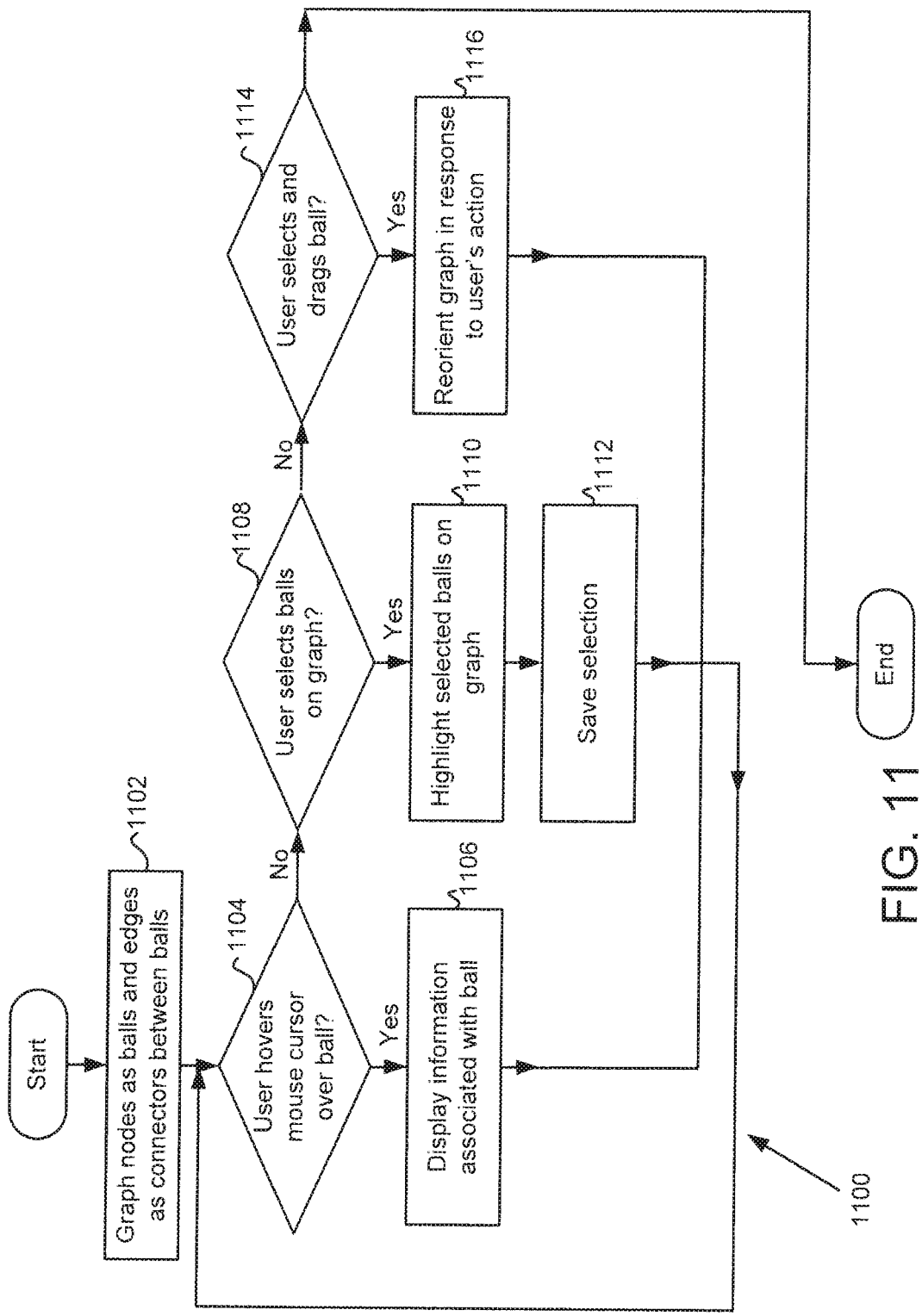
FIG. 11 is a flowchart of functionality of the interactive visualization in some embodiments.

In step 816, the visualization engine 222 generates the interactive visualization of interconnected nodes (e.g., nodes and edges displayed in FIGS. 10 and 11).

Those skilled in the art will appreciate that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 220 may compute simplicial complexes of any dimension (by a variety of rules) on nodes, and apply techniques from homology theory to the graphs to help users understand a structure in an automatic (or semi-automatic) way.

Further, those skilled in the art will appreciate that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

Figure 9:
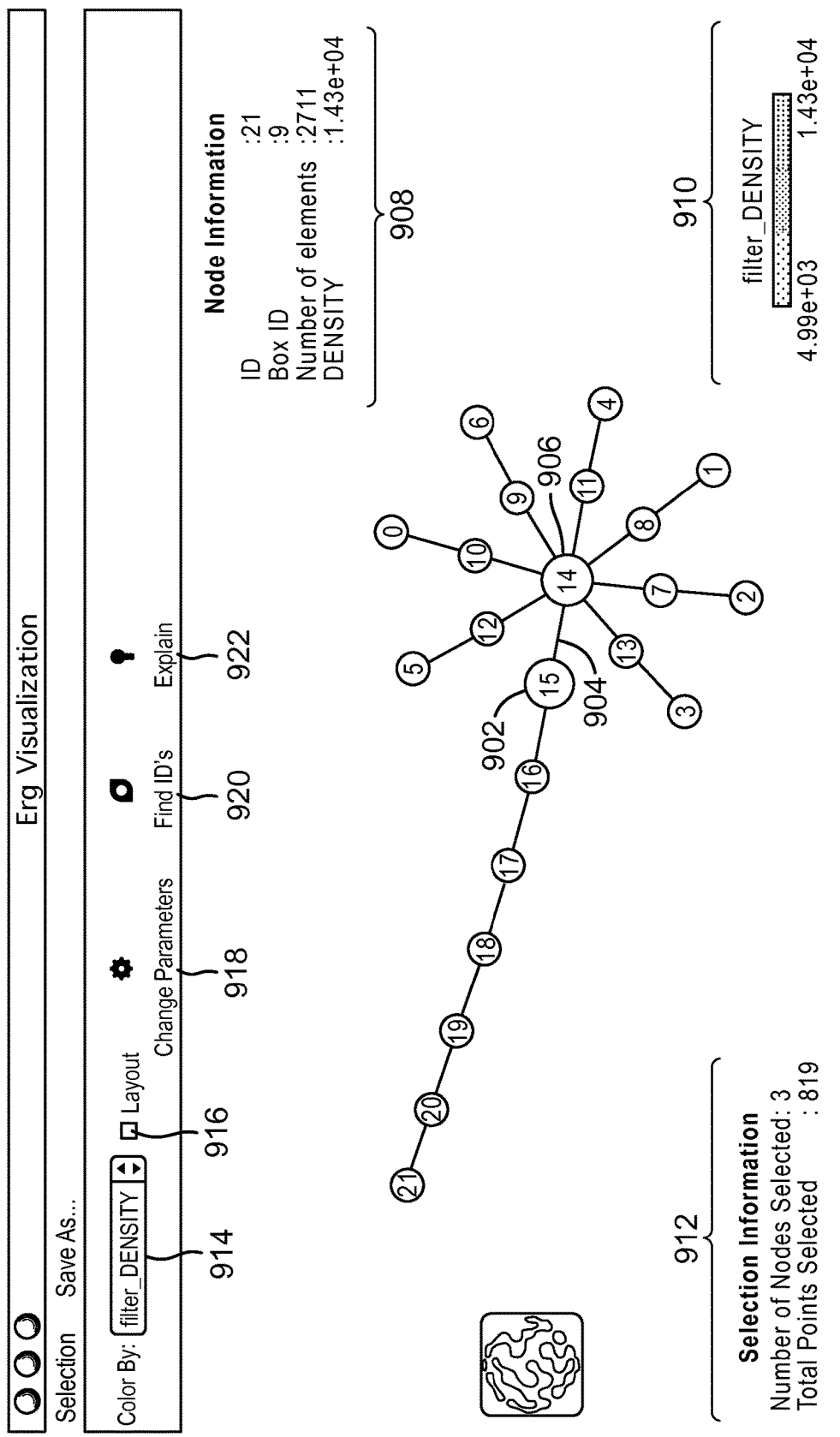
FIG. 9 is an exemplary interactive visualization in some embodiments.

FIG. 9 is an exemplary interactive visualization 900 in some embodiments. The display of the interactive visualization may be considered a "graph" in the mathematical sense. The interactive visualization comprises of two types of objects: nodes (e.g., nodes 902 and 906) (the colored balls) and the edges (e.g., edge 904) (the black lines). The edges connect pairs of nodes (e.g., edge 904 connects node 902 with node 906). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:

Values of fields or filters

Any general functions of the data in the nodes (e.g., if the data were unemployment rates by state, then GDP of the states may be identifiable by color the nodes)

Number of data points in the node

The interactive visualization 900 may contain a "color bar" 910 which may comprise a legend indicating the coloring of the nodes (e.g., balls) and may also identify what the colors indicate. For example, in FIG. 9, color bar 910 indicates that color is based on the density filter with blue (on the far left of the color bar 910) indicating "4.99e+03" and red (on the far right of the color bar 910) indicating "1.43e+04." In general this might be expanded to show any other legend by which nodes and/or edges are colored. Those skilled in the art will appreciate that the, In some embodiments, the user may control the color as well as what the color (and/or stroke color, text, texture, shape, coordinates of the nodes on the screen) indicates.

The user may also drag and drop objects of the interactive visualization 900. In various embodiments, the user may reorient structures of nodes and edges by dragging one or more nodes to another portion of the interactive visualization (e.g., a window). In one example, the user may select node 902, hold node 902, and drag the node across the window. The node 902 will follow the user's cursor, dragging the structure of edges and/or nodes either directly or indirectly connected to the node 902. In some embodiments, the interactive visualization 900 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization module 222 generates the interactive display, the depicted structures may move by spreading out the nodes from each other. In one example, the nodes spread from each other slowly allowing the user to view nodes distinguish from each other as well as the edges. In some embodiments, the visualization module 222 optimizes the spread of the nodes for the user's view. In one example, the structure(s) stop moving once an optimal view has been reached.

Those skilled in the art will appreciate that the interactive visualization 900 may respond to gestures (e.g., multitouch), stylus, or other interactions allowing the user to reorient nodes and edges and/or interacting with the underlying data.

The interactive visualization 900 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 908 may appear that indicates information regarding the selected node. In this example, the node information box 908 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 912 may display some information regarding the selection. For example, selection information box 912 indicates the number of nodes selected and the total points (e.g., data points or elements) of the selected nodes.

The interactive visualization 900 may also allow a user to further interact with the display. Color option 914 allows the user to display different information based on color of the objects. Color option 914 in FIG. 9 is set to filter_Density, however, other filters may be chosen and the objects re-colored based on the selection. Those skilled in the art will appreciate that the objects may be colored based on any filter, property of data, or characterization. When a new option is chosen in the color option 914, the information and/or colors depicted in the color bar 910 may be updated to reflect the change.

Layout checkbox 916 may allow the user to anchor the interactive visualization 900. In one example, the layout checkbox 916 is checked indicating that the interactive visualization 900 is anchored. As a result, the user will not be able to select and drag the node and/or related structure. Although other functions may still be available, the layout checkbox 916 may help the user keep from accidentally moving and/or reorienting nodes, edges, and/or related structures. Those skilled in the art will appreciate that the layout checkbox 916 may indicate that the interactive visualization 900 is anchored when the layout checkbox 916 is unchecked and that when the layout checkbox 916 is checked the interactive visualization 900 is no longer anchored.

The change parameters button 918 may allow a user to change the parameters (e.g., add/remove filters and/or change the resolution of one or more filters). In one example, when the change parameters button 918 is activated, the user may be directed back to the metric and filter selection interface window 600 (see FIG. 6) which allows the user to add or remove filters (or change the metric). The user may then view the filter parameter interface 700 (see FIG. 7) and change parameters (e.g., intervals and overlap) for one or more filters. The analysis node 220 may then re-analyze the data based on the changes and display a new interactive visualization 900 without again having to specify the data sets, filters, etc.

The find ID's button 920 may allow a user to search for data within the interactive visualization 900. In one example, the user may click the find ID's button 920 and receive a window allowing the user to identify data or identify a range of data. Data may be identified by ID or searching for the data based on properties of data and/or metadata. If data is found and selected, the interactive visualization 900 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 922 to receive in-depth information regarding the selection. In some embodiments, when the user selects the explain button 922, the information about the data from which the selection is based may be displayed. The function of the explain button 922 is further discussed with regard to FIG. 10.

In various embodiments, the interactive visualization 900 may allow the user to specify and identify subsets of interest, such as output filtering, to remove clusters or connections which are too small or otherwise uninteresting. Further, the interactive visualization 900 may provide more general coloring and display techniques, including, for example, allowing a user to highlight nodes based on a user-specified predicate, and coloring the nodes based on the intensity of user-specified weighting functions.

The interactive visualization 900 may comprise any number of menu items. The "Selection" menu may allow the following functions:
- Select singletons (select nodes which are not connected to other nodes)
- Select all (selects all the nodes and edges)
- Select all nodes (selects all nodes)
- Select all edges
- Clear selection (no selection)
- Invert Selection (selects the complementary set of nodes or edges)
- Select "small" nodes (allows the user to threshold nodes based on how many points they have)
- Select leaves (selects all nodes which are connected to long "chains" in the graph)
- Remove selected nodes
- Show in a table (shows the selected nodes and their associated data in a table)
- Save selected nodes (saves the selected data to whatever format the user chooses. This may allow the user to subset the data and create new datasources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 900 may comprise any number of menu items. The "Save" menu may allow may allow the user to save the whole output in a variety of different formats such as (but not limited to):
- Image files (PNG/JPG/PDF/SVG etc.)
- Binary output (The interactive output is saved in the binary format. The user may reopen this file at any time to get this interactive window again)

In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 10 is an exemplary interactive visualization 1000 displaying an explain information window 1002 in some embodiments. In various embodiments, the user may select a plurality of nodes and click on the explain button. When the explain button is clicked, the explain information window 1002 may be generated. The explain information window 1002 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 1002 (i.e., the scoring window in FIG. 10) is shown along with the selected nodes. The highest scoring fields may distinguish variables with respect to the rest of the data.

In one example, the explain information window 1002 indicates that data from fields day0-day6 has been selected. The minimum value of the data in all of the fields is 0. The explain information window 1002 also indicates the maximum values. For example, the maximum value of all of the data associated with the day( ) field across all of the points of the selected nodes is 0.353. The average (i.e., mean) of all of the data associated with the day( ) field across all of the points of the selected nodes is 0.031. The score may be a relative (e.g., normalized) value indicating the relative function of the filter; here, the score may indicate the relative density of the data associated with the day( ) field across all of the points of the selected nodes. Those skilled in the art will appreciate that any information regarding the data and/or selected nodes may appear in the explain information window 1002.

Those skilled in the art will appreciate that the data and the interactive visualization 1000 may be interacted with in any number of ways. The user may interact with the data directly to see where the graph corresponds to the data, make changes to the analysis and view the changes in the graph, modify the graph and view changes to the data, or perform any kind of interaction.

FIG. 11 is a flowchart 1100 of functionality of the interactive visualization in some embodiments. In step 1102, the visualization engine 222 receives the analysis from the analysis module 220 and graphs nodes as balls and edges as connectors between balls 1102 to create interactive visualization 900 (see FIG. 9).

In step 1104, the visualization engine 222 determines if the user is hovering a mouse cursor (or has selected) a ball (i.e., a node). If the user is hovering a mouse cursor over a ball or selecting a ball, then in step 1106 the visualization engine 222 displays information is displayed regarding the data associated with the ball. In one example, the visualization engine 222 displays a node information window 908.

If the visualization engine 222 does not determine that the user is hovering a mouse cursor (or has selected) a ball, then in step 1108 the visualization engine 222 determines if the user has selected balls on the graph (e.g., by clicking on a plurality of balls or drawing a box around a plurality of balls). If the user has selected balls on the graph, the visualization engine 222 may highlight the selected balls on the graph in step 1110. The visualization engine 222 may also display information regarding the selection (e.g., by displaying a selection information window 912). The user may also click on the explain button 922 to receive more information associated with the selection (e.g., the visualization engine 222 may display the explain information window 1002).

In step 1112, the user may save the selection. For example, the visualization engine 222 may save the underlying data, selected metric, filters, and/or resolution. The user may then access the saved information and create a new structure in another interactive visualization 900 thereby allowing the user to focus attention on a subset of the data.

If the visualization engine 222 does not determine that the user has selected balls on the graph, the visualization engine 222 may determine if the user selects and drags a ball on the graph in step 1114. If the user selects and drags a ball on the graph, the visualization engine 222 may reorient the selected balls and any connected edges and balls based on the user's action in step 1116. The user may reorient all or part of the structure at any level of granularity.

Those skilled in the art will appreciate that although FIG. 11 discussed the user hovering over, selecting, and/or dragging a ball, the user may interact with any object in the interactive visualization 900 (e.g., the user may hover over, select, and/or drag an edge). The user may also zoom in or zoom out using the interactive visualization 900 to focus on all or a part of the structure (e.g., one or more balls and/or edges).

Further, although balls are discussed and depicted in FIGS. 9-11, those skilled in the art will appreciate that the nodes may be any shape and appear as any kind of object. Further, although some embodiments described herein discuss an interactive visualization being generated based on the output of algebraic topology, the interactive visualization may be generated based on any kind of analysis and is not limited.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method comprising:
accessing a database to access data associated with data points;
initially generating a map of each of the data points to a mathematical reference space using a mathematical filter function to generate the map, each data point being represented once in the mathematical reference space;
generating a cover of open sets in the mathematical reference space, each data point in the mathematical reference space being in at least one of the open sets;
performing at least one similarity function on at least one data point based on data associated with at least one of the open sets of the cover in the mathematical reference space to determine one or more nodes of a plurality of nodes, each of the one or more nodes of the plurality of nodes comprising members representative of at least one subset of the data points;
generating an interactive visualization comprising the plurality of nodes and a plurality of edges wherein each of the edges of the plurality of edges connects nodes with shared members.

2. The method of claim 1, receiving a selection of a first node of the plurality of nodes.

3. The method of claim 2, further comprising receiving a selection of a second node of the plurality of nodes, and displaying information regarding the first node and the second node in the visualization.

4. The method of claim 3, further comprising displaying statistical information about the first node and second node in the visualization.

5. The method of claim 1, further comprising receiving a selection of data identifiers associated with the data in the database and highlighting at least one node of the plurality of nodes in the visualization, the highlighted nodes being associated with the selection.

6. The method of claim 1, receiving a selection of a first function, wherein a first node and a second node of the plurality of nodes are colored differently based on the selected first function.

7. The method of claim 6, wherein the first function is a filter.

8. The method of claim 6, further comprising receiving a second function selection and changing the color of the first and second nodes based on the second function selection.

9. The method of claim 1, further comprising receiving an interval value and an overlap percentage of the cover, re-analyzing the database based on the interval value and the overlap percentage, and regenerating the interactive visualization based on the re-analysis.

10. The method of claim 1, further comprising displaying movement of the visualization after generation, the movement being based on visual optimization of the plurality of nodes.

11. The method of claim 1, wherein a geometric function is utilized as the mathematical filter function.

12. A system comprising:
a processor;
memory including instructions being executable by the processor to control the processor to:
access data associated with data points;
initially generate a map of each of the data points to a mathematical reference space using a mathematical filter function to generate the map, each data point being represented once in the mathematical reference space;
generate a cover of open sets in the mathematical reference space, each data point in the mathematical reference space being in at least one of the open sets;

perform at least one similarity function on at least one data point based on data associated with at least one of the open sets of the cover in the mathematical reference space to determine one or more nodes of a plurality of nodes, each of the one or more nodes of the plurality of nodes comprising members representative of at least one subset of the data points; and generate an interactive visualization comprising the plurality of nodes and a plurality of edges, wherein each of the edges of the plurality of edges connects nodes with shared members.

13. The system of claim 12, wherein the instructions are executable by the processor to further control the processor to receive a selection of a first node of the plurality of nodes.

14. The system of claim 13, wherein the instructions are executable by the processor to further control the processor to receive a selection of a second node of the plurality of nodes, and to display information regarding the first and second nodes in the visualization.

15. The system of claim 12, wherein the instructions are executable by the processor to further control the processor to receive a selection of data identifiers associated with the data in and to highlight at least one node of the plurality of nodes in the visualization, the highlighted nodes being associated with the selection.

16. The system of claim 12, wherein the instructions are executable by the processor to further control the processor to receive a selection of a first function, the first node and a second node of the interactive visualization being colored differently based on a selected first function.

17. The system of claim 16, wherein the first function is a filter.

18. The system of claim 16, wherein the instructions are executable by the processor to further control the processor to receive a second function selection and to change the color of the first and second nodes based on the selection of the second function.

19. A non-transitory computer readable medium comprising instructions, the instructions being executable by a processor to perform a method, the method comprising:

accessing a database to access data associated with data points;

initially generating a map of each of the data points to a mathematical reference space using a mathematical filter function to generate the map, each data point being represented once in the mathematical reference space;

generating a cover of open sets in the mathematical reference space, each data point in the mathematical reference space being in at least one of the open sets;

performing at least one similarity function on at least one data point based on data associated with at least one of the open sets of the cover in the mathematical reference space to determine one or more nodes of a plurality of nodes, each of the one or more nodes of the plurality of nodes comprising members representative of at least one subset of the data points;

generating an interactive visualization comprising the plurality of nodes and a plurality of edges wherein each of the edges of the plurality of edges connects nodes with shared members.

* * * * *